US012616196B2

(12) United States Patent
Niyondiko et al.

(10) Patent No.: US 12,616,196 B2
(45) Date of Patent: May 5, 2026

(54) LONG PROTECTION MOSQUITO REPELLENT OINTMENT

(71) Applicant: MAIA AFRICA SAS, Ouagadougou (BF)

(72) Inventors: Gérard Niyondiko, Ouagadougou (BF); Franck Langevin, Ouagadougou (BF)

(73) Assignee: MAIA AFRICA SAS, Ouagadougou (BF)

( * ) Notice: Subject to any disclaimer, the term of this patent is extended or adjusted under 35 U.S.C. 154(b) by 781 days.

(21) Appl. No.: 17/785,228

(22) PCT Filed: Dec. 17, 2019

(86) PCT No.: PCT/IB2019/060888
§ 371 (c)(1),
(2) Date: Jun. 14, 2022

(87) PCT Pub. No.: WO2021/123876
PCT Pub. Date: Jun. 24, 2021

(65) Prior Publication Data

US 2023/0022722 A1 Jan. 26, 2023

(51) Int. Cl.
*A01N 37/18* (2006.01)
*A01N 25/04* (2006.01)
*A01P 17/00* (2006.01)

(52) U.S. Cl.
CPC ............. *A01N 37/18* (2013.01); *A01N 25/04* (2013.01); *A01P 17/00* (2021.08)

(58) Field of Classification Search
CPC .......... A01P 17/00; A01N 25/04; A01N 37/18
See application file for complete search history.

(56) References Cited

U.S. PATENT DOCUMENTS

2004/0170660 A1* 9/2004 Wendel .................. A61Q 19/00 424/405

FOREIGN PATENT DOCUMENTS

| | | | |
|---|---|---|---|
| CN | 110151656 | * | 8/2019 |
| GB | 2405340 | | 3/2005 |
| JP | 04082802 | * | 3/1992 |

OTHER PUBLICATIONS

JP04-082802, see English translation, 1992 (Year: 1992).*
CN 110151656, See English translation, 2019 (Year: 2019).*
Anon., "Deet—Wikipedia", (Nov. 30, 2019), URL: https://web.archive.org/web/20191130082931if_/https://en.wikipedia.org/wiki/DEET, (Aug. 13, 2020), XP055722490.
Sophie Douce, "Au Burkina, les belles promesses de la pommade anti-paludisme", (Apr. 22, 2019), URL: https://www.lemonde.fr/afrique/article/2019/03/20/au-burkina-les-belles-promesses-de-la-pommade-anti-paludisme_5438916_3212.html, (Aug. 13, 2020), XP055722454.
A Ouédraogo, "Pommade Maïa : un moyen de prévention du paludisme qui allie soin et protection", (Jun. 8, 2019), pp. 1-8, URL: https://www.radarsburkina.net/index.php/fr/societe/1442-pommade-mala-un-moyen-de-prevention-du-paludisme-qui-allie-soin-et-protection, (Sep. 2, 2020), XP055726782.
Emmanuel Mbuba et al. "Maia Topical repellent ointment provides long lasting protection against Anophleles gambiae s.s., Anopheles arabiensis and Aedes aegypti under semi-field conditions in Tanzania", doi:10.21203/rs.3.rs-56100/v1, (Aug. 8, 2020), URL: https://assets.researchsquare.com/files/rs-56100/v1/5d8154ca-a264-4303-8373-3c51c25266b1.pdf, (Aug. 13, 2020), XP055722498.

* cited by examiner

*Primary Examiner* — Umamaheswari Ramachandran
(74) *Attorney, Agent, or Firm* — DUANE MORRIS LLP; Gregory M. Lefkowitz; Brandon A. Chan

(57) ABSTRACT

The invention relates to an ointment comprising shea butter, petrolatum, beeswax, perfume and 10 to 20% by weight of DEET based on the total weight of the ointment, providing a protection against mosquitoes for at least 7 hours, its uses as a mosquito repellent and for the prevention of diseases such as malaria, and its manufacturing process.

10 Claims, 4 Drawing Sheets

[Fig. 1]
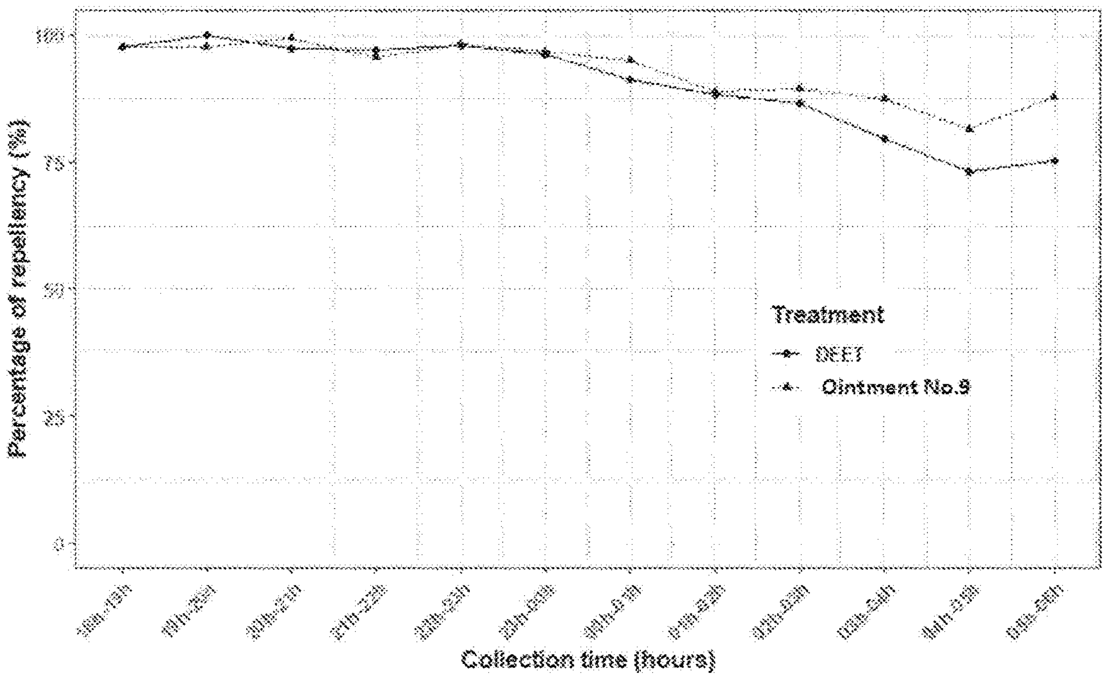
[Fig. 2]
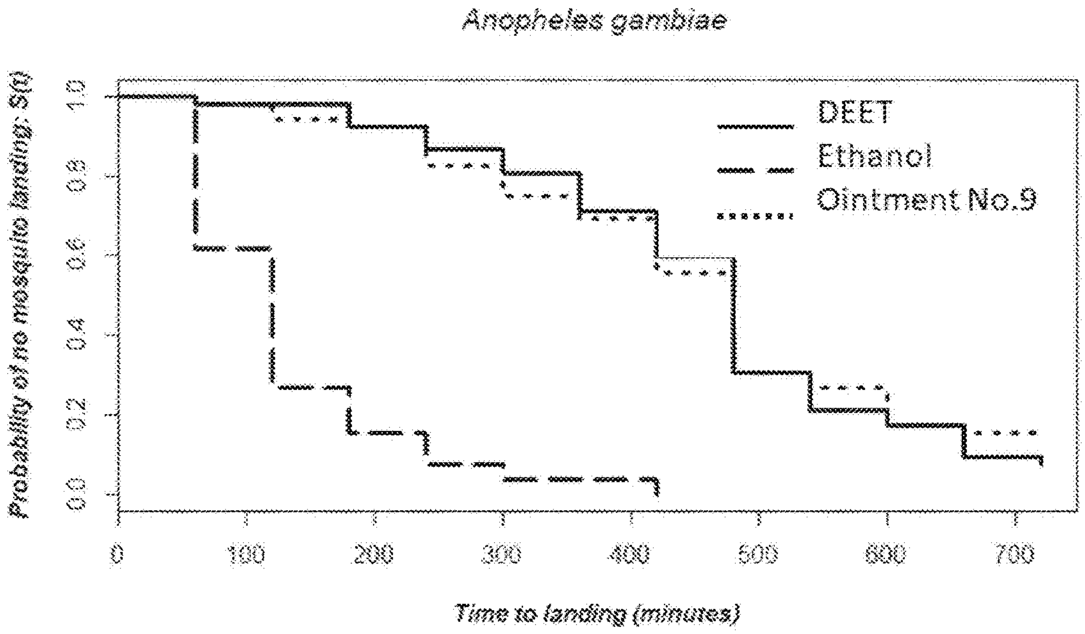

[Fig. 3]
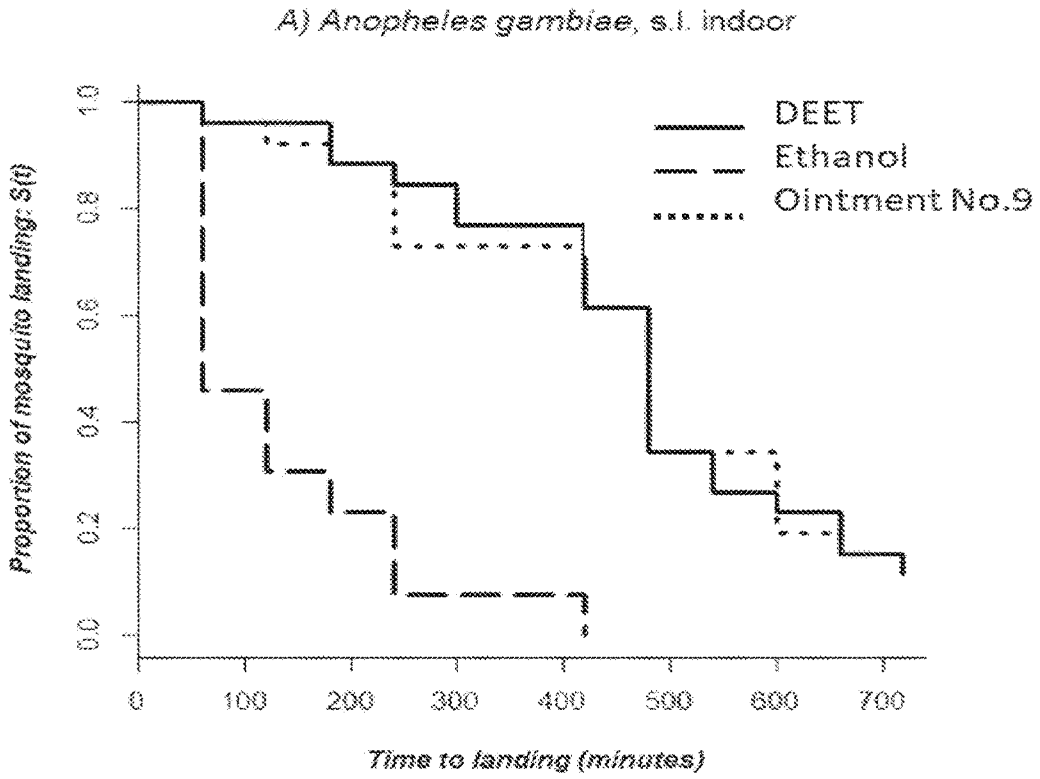
[Fig. 4]
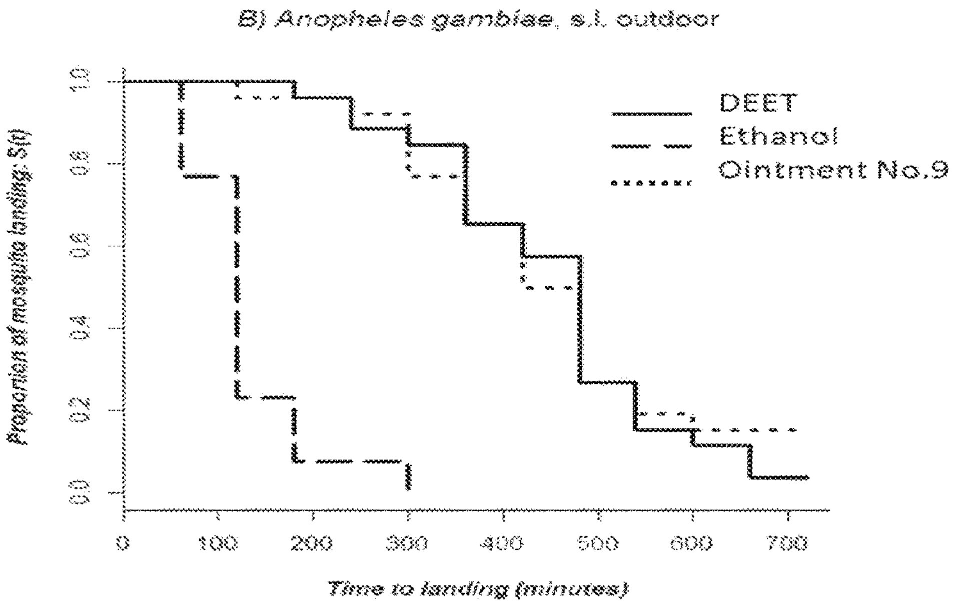

[Fig. 5]
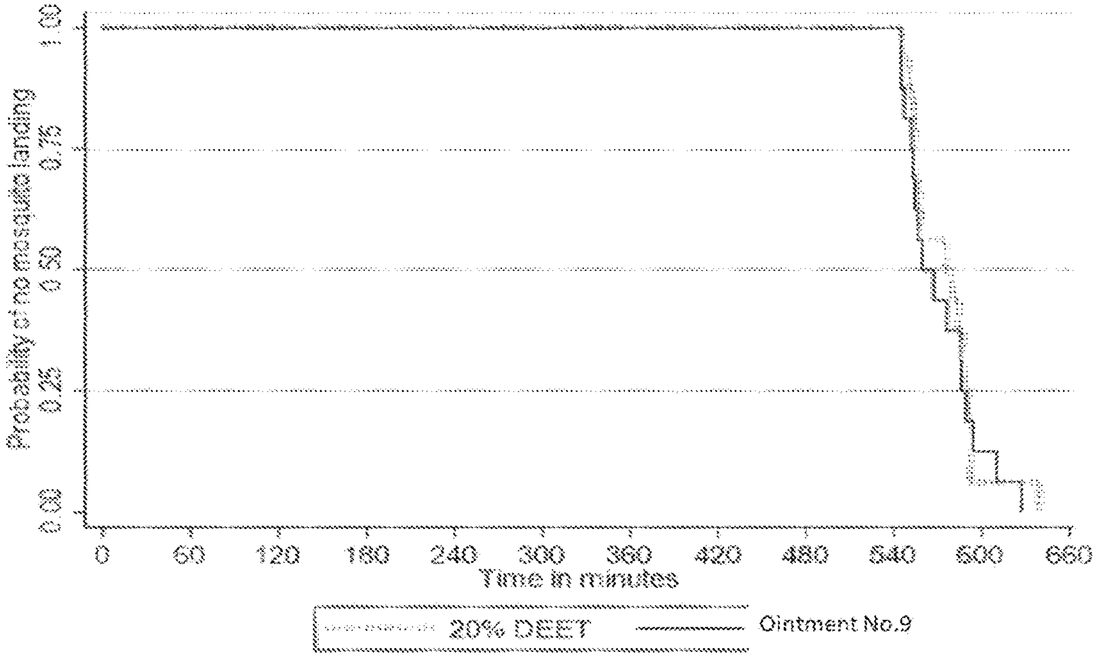
[Fig. 6]
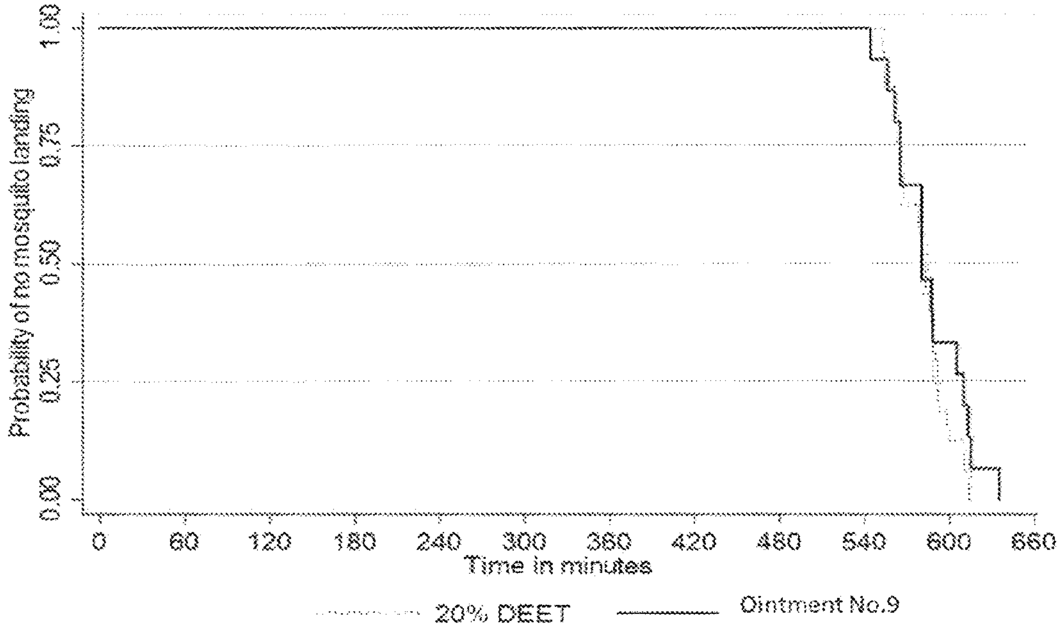

[Fig. 7]
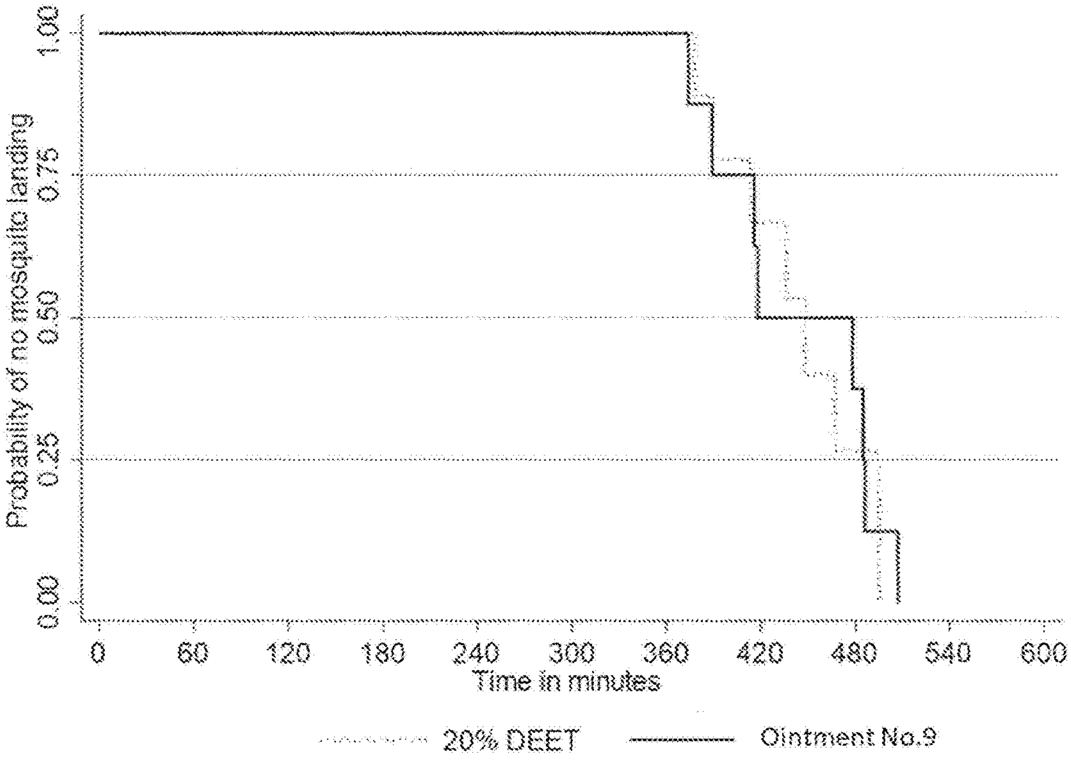

LONG PROTECTION MOSQUITO REPELLENT OINTMENT

CROSS-REFERENCE TO RELATED APPLICATIONS

This application is a § 371 national stage entry of International Application No. PCT/IB2019/060888, filed Dec. 17, 2020, the entire contents of which are incorporated herein by reference.

FIELD OF THE INVENTION

This invention concerns a mosquito repellent ointment that provides more than 7 hours of protection against mosquitoes. Such ointment is particularly useful for preventing mosquito-borne diseases such as malaria, dengue, chikungunya, Zika and yellow fever, preferably malaria.

TECHNICAL BACKGROUND

Mosquitoes are among the most dangerous animals in the world in terms of the number of deaths they cause. Their ability to carry diseases and transmit them to humans causes hundreds of thousands of deaths each year.

Malaria is a fatal disease caused by parasites belonging to the genus *Plasmodium*. The parasite is transmitted to humans through the bite of infected mosquitoes of the genus *Anopheles*. According to the WHO, malaria causes around one million victims per year worldwide. About 40% of the world's population is exposed to the disease and 500 million clinical cases are observed each year. The situation is all the more critical as parasites develop resistance to antimalarial molecules and mosquitoes become increasingly resistant to insecticides. To date, there is no vaccine available on the market to protect against this disease.

Four species of parasites of the genus *Plasmodium* are responsible for the disease in humans:

(i) *Plasmodium falciparum* is the most pathogenic species and is responsible for fatal cases. It occurs in tropical areas of Africa, Latin America and Asia, and is the dominant species in Africa;

(ii) *Plasmodium vivax* co-exists with *Plasmodium falciparum* in many parts of the world, and is present in some temperate regions;

(iii) *Plasmodium oval*, mainly found in West Africa, does not kill but can cause relapses 4 to 5 years after the first infection; and (iv) *Plasmodium malariae* has a very uneven global distribution. It is not fatal but can lead to relapses up to 20 years after the first infection.

There are preventive treatments against malaria such as atovaquine, proguanil, chloroquine, mefloquine, doxycylcin and their combinations. However, the side effects of these treatments are important and can have serious consequences, such as mefloquine, which has significant neurological side effects that led to its prohibition in some countries. Moreover, none of these treatments can be taken for life. Their price is also far too high for local populations.

Non-drug protection measures such as the use of impregnated mosquito nets, insecticides and mosquito repellents can also be used. However, treated nets are often too expensive for most-at-risk populations. Mosquitoes are more resistant to insecticides, so they do not provide effective protection.

In addition, mosquitoes have changed their behavior in response to the massive use of insecticide. A study conducted in Papua New Guinea showed a shift in mosquito biting from night to earlier hours in the evening after a nationwide distribution of Long-Lasting Insecticide-treated Nets (LLINs). Similar changes in the behavior of *Anopheles funestus* have been observed in Benin and Senegal after insecticide treated nets achieved universal coverage. Furthermore, studies have described that the scaling up in LLINs and IRS have also led to most outdoor biting in the *Anopheles gambiae* s.l. commonly known as endophagic. A recent study in the Cascades region showed that more than 50% of the major vectors, *An. gambiae* s.l., were collected biting outdoor. The outdoor, early evening and morning biting habits of *Anopheles* combined with resistance to insecticides showed that the mass distribution of insecticide treated nets alone eventually leads to a reduction in the efficacy of this intervention. A recent study on the thermal ecology of malaria transmission and the potential impact of behavioral resistance notes that an increase in early evening biting could increase transmission not only because people are unprotected by nets, but also because there is a higher chance of malaria vectors becoming infectious. The development of new vector control tools in addition to LLINs is necessary to protect people whenever they are not under a net.

Another parameter to be taken into account is the acceptability of the product by local populations. Repellent sprays are not in the habits of local populations and are often too expensive. Indeed, a large quantity must be sprayed to allow a homogeneous protection of the individual. In addition, current repellents only provide 5 hours of protection from the time of application, which means that they must be applied regularly and that, even if the repellent is applied at bedtime, it is not possible to be protected during the whole period of sleep.

A repellent ointment marketed by the inventors under the brand name MAIA® comprises 61% by weight of shea butter, 13% of petrolatum, 4.5% of sunflower oil, 6% of beeswax and 15% DEET. It only provides 5 h30-6 hours of protection against *Anopheles* mosquitoes.

It is therefore necessary to provide mosquito repellent compositions that provide protection for more than 6 hours, are inexpensive and are well accepted by local populations.

SUMMARY OF THE INVENTION

These objectives are achieved through the mosquito repellent ointment according to the invention and its use for the prevention of diseases transmitted by mosquitoes.

The invention pertains to a mosquito repellent ointment comprising petrolatum, shea butter, oil, beeswax, perfume and 10 to 20% by weight of DEET based on the total weight of the ointment, providing a protection against mosquitoes for at least 7 hours.

Advantageously, the mosquito repellent ointment of the invention provides protection against mosquitoes for about 8 to 10 hours, preferably about 9 hours.

Preferably, the mosquito repellent ointment of the invention comprises 15% DEET.

Advantageously, the mosquito repellent ointment according to the invention may comprise between 25% to 65%, preferably between 40% and 60%, more preferably about 47% by weight of petrolatum based on the total weight of the ointment.

Advantageously, the mosquito repellent ointment according to the invention may comprise between 10% to 45%, preferably between 20% to 35%, more preferably about 30% by weight of shea butter based on the total weight of the ointment.

Advantageously, the mosquito repellent ointment according to the invention may comprise between 1% to 5%, preferably 3% by weight of beeswax based on the total weight of the ointment.

Advantageously, the mosquito repellent ointment according to the invention may comprise between 0 to 2%, preferably about 0.5% by weight of perfume based on the total weight of the composition.

Advantageously, the mosquito repellent ointment according to the invention may comprise between 1% to 10%, preferably about 3% to 6%, more preferably about 4.5% by weight of oil based on the total weight of the ointment.

Advantageously, said oil can be chosen amongst vegetal oils, mineral oils or their combination.

In a preferred embodiment, said oil is cotton seed oil.

In a preferred embodiment, the oil is not sunflower seed oil.

In a preferred embodiment, the mosquito repellent ointment according to the invention comprises 47% by weight of petrolatum, 30% by weight of shea butter, 15% by weight DEET, 4.5% by weight of cotton seed oil, 3% by weight of beeswax, 0.5% by weight of perfume based on the total weight of the ointment.

Advantageously, mosquitoes belong to the *Anopheles* genus and/or *Aedes* genus.

In a first embodiment, mosquitoes belong to the *Anopheles* genus, preferably to the complex *Anopheles gambiae* and/or *Anopheles arabiensis*, more preferably to the complex *Anopheles gambiae*.

In a second embodiment, mosquitoes belong to the *Aedes* genus, preferably to the complex *Aedes aegypti*.

Another object of the invention is the used of the mosquito repellent ointment of the invention for the prevention of diseases transmitted by mosquitoes.

Advantageously, the disease transmitted by mosquitoes is chosen amongst malaria, dengue, chikungunya, Zika and yellow fever.

Advantageously, mosquitoes belong to the *Anopheles* genus and/or *Aedes* genus.

In a first embodiment, mosquitoes belong to the *Anopheles* genus, preferably to the complex *Anopheles gambiae* and/or *Anopheles arabiensis*, more preferably to the complex *Anopheles gambiae*.

In a second embodiment, mosquitoes belong to the *Aedes* genus, preferably to the complex *Aedes aegypti*.

In a preferred embodiment, the disease transmitted by mosquitoes is malaria.

Another object of the invention is the manufacturing process of the mosquito repellent ointment of the invention comprising at least the following steps:

a) mixing all the fats together,
b) heating the mixture up to melting point, preferably up to 65° C. under continuous agitation,
c) adding DEET and optionally perfume, and
d) maintaining agitation between 5 minutes to an hour, preferably 6 to 30 minutes, most preferably between five to ten minutes.

Advantageously, the step of mixing all the fats comprises an oil such as a vegetal or mineral oil.

Preferably, said oil is cotton seed oil.

DETAILED DESCRIPTION OF THE INVENTION

The subject matter of the present invention is to provide a mosquito repellent ointment providing a long protection time against mosquitoes.

More specifically, the invention relates to a mosquito repellent ointment comprising petrolatum, shea butter, oil, beeswax, perfume and 10% to 20% by weight of DEET based on the total weight of the ointment, providing a protection against mosquitoes for at least 7 hours.

The inventors have developed an ointment formulation which protects humans against mosquitoes for at least 7 hours. The mosquito repellent ointment of the invention provides thus a longer protection time than repellent sprays or repellent ointment of the prior art, which only provides protection for 5 to 6 hours. Therefore, the mosquito repellent ointment of the invention provides longer protection than the formulations of the prior art. The protection provided by the mosquito repellent ointment of the invention can last for the entire night, without the need to reapply the ointment. The users are thus better protected against mosquitoes, and the risks to be infected by a disease such as malaria are thus greatly reduced.

One of the advantages of the mosquito repellent ointment of the invention is that it is well accepted by the populations living in the zone at risks, especially of malaria. More specifically, the inventors have noted that mothers apply moisturizing creams and butters, such as rhea butter, on their skins and their children at the end of the day. The inventors have thus decided to formulate the repellent as an ointment, in order to fit in the habits of the local populations and increase the acceptability of the ointment.

Due to its specific formulation, the mosquito repellent ointment of the invention has a homogeneous consistency and provides an even coverage on the skin, which is important both in terms of acceptance by the users and efficacy of the repellent.

In addition, the ingredients composing the mosquito repellent ointment of the invention are inexpensive and can be locally sourced. Therefore, the mosquito repellent ointment of the invention can be afforded by the populations living in the zones at risks of malaria, dengue, chikungunya, Zika or yellow fever.

The mosquito repellent ointment of the invention thus provides a preventive treatment against diseases that are transmitted by mosquitoes, especially malaria, that is safe to use for the local population, provides longer protection time, is well accepted by the populations living in the zones at risk and is affordable for these populations. The ointments of the invention can also be used safely on children.

The protection time provided by the ointment is measured according to the "*Guidelines for efficacy testing of mosquito repellents for human skin*" published by the World Health Organization in 2009 (WHO/HTM/NTD/WHOPES/2009.4).

In a preferred embodiment, the mosquito repellent ointment according to the invention provides about 8 to 10 hours of protection against mosquitoes.

Within the context of the invention, an ointment is a greasy, monophasic semi-solid preparation, often anhydrous and containing dissolved or dispersed active ingredients, such as DEET.

DEET, also designated by N,N-diethyl-3-méthylbenzamide or diethyloluamide, is an insect repellents which has the following formula:

[Chem. 1]

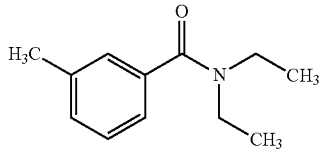

DEET is usually included in mosquito repellents at a concentration of at least 20% and, at this concentration, can provide 5 to 6 hours of protection against *Anopheles*. However, the mosquito repellent ointment of the invention, thanks to its specific formulation can provide a longer protection, for at least 7 hours and more preferably about 8 to 10 hours with a concentration of 10% to 20%, preferably 15%, by weight of DEET, based on the total weight of the ointment.

As a remark, when a range of values is provided in the description, the specified limits of each range are included.

Petrolatum

Petrolatum can also be designated by Vaseline, paraffinum album, Vaseline blanch, vaselinum album, petrolatum album. It is an oily excipient providing a moisturizing effect on the skin and is often used for skin care and treatment of skin irritation. It is obtained from the remainder substance after petrol distillation. It is formed by whitening soft yellow paraffin. It does not cause irritation.

The mosquito repellent ointment according to the invention may comprise between 25% to 60%, preferably between 40% and 50%, more preferably about 47% by weight of petrolatum based on the total weight of the ointment.

Within the context of the description, a weight percentage is calculated as follows: (weight of the ingredient/total weight of the composition)×100.

Shea Butter

The INCI name of shea butter is *Butyrospermum parkii* butter. It is a vegetal fat, rich in specific unsaponifiables, that protects the skin and repairs damage caused by climatic aggressions, pollution and UV radiations. It is recommended for lip care, dry and sensitive skin, hand and body care and scalp treatments. It provides the skin with unique plant molecules with soothing, regenerating and protective virtues.

The mosquito repellent ointment according to the invention may comprise between 10% to 45%, preferably between 20% to 35%, more preferably about 30% by weight of shea butter based on the total weight of the ointment.

The specific amount of shea butter allows to provide to the ointment of the invention a pleasant texture as well as soothing and moisturizing properties to the ointment of the invention.

Beeswax

The INCI name of beeswax is Cera alba. It is a wax obtained from the honeycomb of the bee. It consists primarily of myricyl palmitate, cerotic acid and esters and some high-carbon paraffins. It can also be synthetized. It is an emollient, emulsifying and film-forming ingredient.

The mosquito repellent ointment according to the invention may comprise between 1% to 5%, preferably about 3% by weight of beeswax based on the total weight of the ointment.

The use of beeswax in the ointment of the invention provides an additional moisturizing effect to the ointment. In addition, it provides a pleasant odour to the ointment. More importantly, the beeswax, at this specific amount of about 3%, provides a firm consistency to the ointment of the invention.

Perfume

The mosquito repellent ointment according to the invention may comprise between 0 to 2%, preferably about 0.5% by weight of perfume based on the total weight of the composition.

Preferably, the perfume is the perfume marketed by the French company Charabot under the catalogue reference "9137101Tutti Frutti" (as published on 2 May 2019).

This perfume provides a pleasant odour to the ointment which increases the acceptance from the local populations, especially children. In addition, this specific perfume can be introduced at about 0.5%, while perfumes usually are incorporated at about 2%. Such proportion of 2% usually break the texture of the ointment, which means that the ointment is not monophasic.

On the opposite, the low proportion of perfume in the ointment of the invention, is especially a proportion of about 0.5% by weight, allows to provide an ointment having a nice odour, while obtaining a monophasic texture of the composition.

Oil

The mosquito repellent ointment of the invention may comprise between 1% to 10%, preferably about 3% to 6%, more preferably about 4.5% of oil by weight based on the total weight of the ointment.

For the purpose of the invention, the oil can be a vegetal oil, a mineral oil or their combination. Preferably, the ointment of the invention does not comprise sunflower seed oil. The INCI name of sunflower seed oil is *Helianthus Annuus* (Sunflower) Seed Oil.

If the oil is a mineral oil, then it is preferably Vaseline oil, which INCI name is Paraffinum liquidum.

In a more preferred embodiment, the oil is a vegetal oil, more preferably cotton seed oil. The INCI name of cotton seed oil is *Gossypium herbaceum* seed oil. It is the fixed oil expressed from the seeds of cotton. It is used as a skin conditioning agent. In addition, it can be locally sourced and is thus cheaper than other oil. It also provides a better consistency to the ointment of the invention than the mineral oil such as Vaseline oil.

In a more preferred embodiment, the mosquito repellent ointment according to the invention comprises 47% by weight of petrolatum, 30% by weight of shea butter, 15% by weight DEET, 4.5% by weight of cotton seed oil, 3% by weight of beeswax, 0.5% by weight of perfume based on the total weight of the ointment.

Use

Another object of the invention is the mosquito repellent ointment of the invention for its used in the prevention of diseases transmitted by mosquitoes such as malaria, dengue, chikungunya, Zika, and yellow fever. In a preferred embodiment, the mosquito repellent ointment of the invention is used as a prevention against malaria. All these viruses are passed on to humans through the bites of an infective female mosquito, which mainly acquires the virus while feeding on the blood of an infected person.

Indeed, the inventors have demonstrated that the mosquito repellent ointment of the invention is particularly efficient to repel mosquitoes belonging to the *Anopheles* genus and/or *Aedes* genus. Therefore, the mosquito repellent ointment of the invention can be successfully used to protect from the biting of the mosquitoes. The mosquito repellent ointment of the invention can thus be used as a prevention mean from the diseases transmitted by mosquitoes, such as malaria.

In a first embodiment, mosquitoes belong to the *Anopheles* genus, such as *Anopheles gambiae* s.l., *Anopheles arabiensis, Anopheles funestus*, and *Anopheles pharoensis*, which belong to the complex *Anopheles gambiae*. More specifically, *Anopheles arabiensis, Anopheles funestus, Anophles gambiae* are responsible for over 95% of total malaria transmission for *Plasmodium falciparum* in continental sub-Saharan Africa. Since the ointment of the invention is effective to repel these mosquitoes, the ointment of the invention can be thus successfully used as a prevention mean against malaria.

In a second embodiment, mosquitoes belong to the *Aedes* genus, preferably to the complex *Aedes aegypti. Aedes aegypti*, also called the yellow fever mosquito, is a mosquito that can spread dengue, chikungunya, Zika, and yellow fever viruses Mosquitoes belonging to the genus *Anopheles* or *Aedes* are the main vectors of the most dangerous malaria parasite: *Plasmodium falciparum*. In addition, it has been demonstrated that these mosquitoes have become increasingly resistant to insecticides.

Manufacturing Process

Another object of the invention is the manufacturing process of the mosquito repellent ointment of the invention comprising at least the following steps:

(i) mixing all the fats together,
(ii) heating the mixture up to melting point, preferably up to 65° C., under continuous agitation,
iii) adding DEET and optionally perfume, and
(iv) maintaining agitation between 5 minutes to an hour, preferably 5 to 30 minutes, most preferably between 5 to 10 minutes.

The process of the invention can further comprise a step of filling containers, such as pots or jars, for the marketing of the ointment of the invention.

The fats to be mixed at step (ii) comprises petrolatum, rhea butter, oil and beeswax.

The oil can be a vegetal, a mineral oil or their combination. Preferably, said oil is a vegetal oil, more preferably cotton seed oil.

Preferably, DEET and the perfume are added once the mixture obtained from ep (iii) is homogenised.

Preferably, the agitation of step (iv) is maintained until homogenisation.

Advantageously, steps (iii) and (iv) are carried out at a temperature between 50 and 65° C., preferably between 55-60° C.

Preferably, steps (iii) and (iv) are carried out at an agitation speed between 500 rpm and 700 rpm.

FIGURES

FIG. 1 is a diagram showing the percentage of repellency of 20% DEET and an ointment according to the invention, both indoor and outdoor.

FIG. 2 is a diagram showing the probability of no mosquito landing according to the treatment.

FIG. 3 is a diagram showing the probability of no mosquito landing according to the treatment (indoor).

FIG. 4 is a diagram showing the probability of no mosquito landing according to the treatment (outdoor).

FIG. 5 is a diagram showing the probability of no mosquito *An. gambiae* landing according to the treatment in Example 2.

FIG. 6 is a diagram showing the probability of no mosquito *An. arabiensis* landing according to the treatment in Example 2.

FIG. 7 is a diagram showing the probability of no mosquito *Aedes aegypti* landing according to the treatment in Example 2.

EXAMPLES

In the following description, the examples are provided for illustrative purposes only and are not intended to limit the scope of the invention.

Example 1—Formulation Assays

Ten compositions according to the invention have been prepared and tested to determine the best composition. Briefly, the various ointments have been prepared according to the following steps:

(i) weighing each ingredient according to the proportions indicated in Table 1,
(ii) mixing all the fats (petrolatum, shea butter, cotton seed oil or petrolatum oil, beeswax) in a blender,
(iii) heating the mixture up to 65° C. under continuous agitation until a homogeneous mixture is obtained.
(iv) adding DEET and perfume once the mixture is homogeneous, and
(v) maintaining agitation for at least five to ten minutes to homogenize the mixture.

The proportions of each ointment according to the invention is detailed in Table 1 below.

TABLE 1

| Ingredients | Ointment 1 | Ointment 2 | Ointment 3 | Ointment 4 | Ointment 5 |
|---|---|---|---|---|---|
| Shea Butter (CAS 194043-92-0) | 13 | 13 | 20 | 20 | 30 |
| Petrolatum (CAS 8009-03-8) | 61 | 61 | 54 | 54 | 44 |
| DEET (CAS 134-62-3) | 15 | 15 | 15 | 15 | 15 |
| Beeswax (CAS 8012-89-3) | 6 | 6 | 6 | 6 | 6 |
| Cotton seed oil (CAS 8001-29-4) | 4.5 | 0 | 4.5 | 0 | 4.5 |
| Petrolatum oil | 0 | 4.5 | 0 | 4.5 | 0 |
| Perfume | 0.5 | 0.5 | 0.5 | 0.5 | 0.5 |
| Total (g) | 100 | 100 | 100 | 100 | 100 |

TABLE 1-continued

| Ingredients | Ointment 6 | Ointment 7 | Ointment 8 | Ointment 9 | Ointment 10 |
|---|---|---|---|---|---|
| Shea Butter (CAS 194043-92-0) | 30 | 45 | 245 | 30 | 47 |
| Petrolatum (CAS 8009-03-8) | 44 | 29 | 29 | 47 | 30 |
| DEET (CAS 134-62-3) | 15 | 15 | 15 | 15 | 15 |
| Beeswax (CAS 8012-89-3) | 6 | 6 | 6 | 3 | 3 |
| Cotton seed oil (CAS 8001-29-4) | 0 | 4.5 | 0 | 4.5 | 0 |
| Petrolatum oil | 4.5 | 0 | 4.5 | 0 | 4.5 |
| Perfume | 0.5 | 0.5 | 0.5 | 0.5 | 0.5 |
| Total (g) | 100 | 100 | 100 | 100 | 100 |

The purpose is to obtain a monophasic ointment which is not runny or lumpy, in order to obtain a nice texture that is appreciated by the users and provides a homogenous coverage once applied on the skin. The homogeneity of the coverage is important in order to provide an even protection against mosquitoes.

Formulations 1 and 2, which formulation is dose to the formulation of the former ointment MAÏA®, are runny and lumpy. Formulations integrating cotton seed oil rather than petrolatum oil provides a better consistency. Beeswax in a proportion of 3% provide a monophasic ointment and holds the shea butter and petrolatum together.

The best formulation in terms of consistency and texture is ointment No. 9.

Example 2—Protection and Repellency Assay No. 1

The protection time provided by ointment No. 9 of Example 1 has been measured according to the "*Guidelines for efficacy testing of mosquito repellents for human skin*" published by the World Health Organization in 2009 (noted hereafter "WHO Guidelines, 2009"). These guidelines describe how human landing catches must be performed on volunteers. The effectiveness of ointment No. 9 was evaluated and compared to a 20% ethanol solution of DEET (N, N-Diethyl-3-methylbenzamide), being the positive control, and an ethanol solution being the negative control.

More specifically, ointment No. 9 comprises 47% by weight of petrolatum, 30% by weight of rhea butter, 15% by weight DEET, 4.5% by weight of cotton seed oil, 3% by weight beeswax and 0.5% by weight of perfume based on the total weight of the ointment.

Briefly, the study was carried out in real conditions at the Goden village (12°25'N, 1°20'W), a rural village in the locality of Gampela, 25 km north-east of Ouagadougou, the capital city of Burkina Faso. Goden is in the Sudanian Savanna with approximately 800 inhabitants mainly belonging to the Mossi ethnic group, mostly devoted to agriculture and rearing few animals such as dogs, pigs and others. Goden is known for its high density of malaria vectors due to its proximity to the Massiri river. This study was carried out during the high malaria transmission period, when the mosquito density was the highest A preliminary assessment of the collection site was carried out by undertaking captures on human volunteers before the tests themselves.

A total of twenty volunteers have been recruited from the Goden village and have been trained for the nocturnal collection of mosquitoes on human bait using mouth aspirator and flash torch known as Human Landing Catches (HCL). The age of the volunteers ranged from 18 to 50 years old. After receiving explanation of the aims, benefits and risks of the study, they signed a written informed consent. The composition of the ointment was not disclosed to the volunteers. Volunteers were instructed not to use any fragranced soap or perfume, tobacco or alcohol 12 hours before the start and throughout the experiments. Before applying treatments, the lower leg of volunteers was washed with neutral soap, rinsed with 70% of ethanol solution and naturally dried. Once their legs treated volunteers were also asked to avoid rubbing, touching or wetting the repellent-treated area.

Three treatments have been carried out in the study:
  (i) one negative control (ethanol 100%),
  (ii) two treatments of 20% DEET diluted in ethanol 100% of technical quality used as a positive control, since this repellent is considered as the reference,
  (iii) two treatments of ointment No. 9.

The products were applied to the bare leg of the volunteers and the areas of application were exposed to mosquito bites in the field. Volunteers applied to their exposed leg: Ointment No. 9 at a dosage of 2 mg/cm$^2$, and 20% DEET in ethanol for the positive control at a dosage of 1 ml per 600 cm$^2$.

To establish the amount of repellent required for application in the experiments, the surface area of the leg of each volunteer were determined by first measuring the circumferences expressed in centimeter (cm) just below the knee, and above the ankle, multiplied by the length of the lower leg, measured from the knee to the ankle. The surface area (in cm$^2$) of skin was calculated according to formula (1) below:

$$Area = \frac{1}{2}(Ck+Ca)Dka, \tag{1}$$

wherein Ck is the circumference below the knee in cm, Ca is the circumference above the ankle in centimeter, and Dka is the distance in centimeter between Ca and Ck. The amount needed for each volunteer was then determined depending on their leg length. In addition, the quantity of product left in bottles was weighed using a precision weighing balance (KERN & SOHN GmbH) to determine the amount applied by each volunteer. Overall, the average amount applied was 2.4±0.2 g per 1189±79.2 cm$^2$ and per volunteer's lower leg, leading to 2 mg/cm$^2$ of Ointment No. 9 and 2±0.1 mL/cm$^2$ of a 20% DEET solution.

Volunteers were divided into five groups of four volunteers. All the members of a group received the same treatment at the same time. Thirty minutes after applying the treatment, the group were assigned to one of five houses that were at least 20 meters apart, as recommended in the WHO Guidelines (WHO Guidelines, 2009), in order to avoid biases due to competition in attractiveness to the mosquitoes. Except for the treated lower leg, the whole body was fully protected from mosquito bites. Each volunteer wore a long-sleeved shirt, buttoned at the wrist, long trousers, closed shoes and latex gloves with a hat on the head. The trousers of the treated leg were rolled to the knee exposing only the lower legs to biting mosquitoes.

For each house, one member of the pair was collecting indoor and the other outdoor alternately every hour from 6 pm to midnight. A second pair continued from midnight to 6 am. During an exposure period volunteers were sat on a chair and collected any mosquito landing on the exposed lower leg. Collected insects were transferred into plastic caps covered with a net and a small hole at the bottom to allow mosquitoes to be easily aspirated into them. As with the treatment allocation, the sequence of rotation between the positions followed a Williams balanced Latin Square design and was randomly assigned to the study participants at the beginning of each session by drawing lots. The mosquitoes were collected from 6 pm to 6 am the next morning. After collection, mosquitoes were morphologically identified using a stereo microscope and the identification keys (Gillies, M. T. and B. DeMeillon, *The Anophelinae of Africa South of the Sahara* (*Ethiopian zoogeographical region*), 968, Johannesburg: South African Institute for Medical Research).

All data have been collected on standard forms and were entered twice in a database by different persons. Databases have been compared using Epi Info™ 3.5.3, and inconsistencies were verified using the printed and corrected forms. The performance of the repellent was measured by calculating the repulsive efficiency and the median full protection time.

The repulsive efficacy was calculated as a percentage of repulsion (% R) according to the formula (2) below:

$$\% R=((C-T)/C)\times 100, \quad (2)$$

where C is the average number recaptured on the control volunteer's lower limbs, and T is the total number of stinging mosquitoes on the legs of volunteers treated either with the test product or the positive control (WHO Guidelines, 2009).

The complete protection time (CPT) was defined as the time interval between the beginning of the collection/test and the first mosquito landing. To estimate the median complete protection time (CPT) of each treatment, a Kaplan-Meier survival analysis was meant to be performed for each vector species. However, this analysis was performed only on *Anopheles* only as constituted ~99% of the total collection. Data analysis was done using the 'survival package' from R software-version 3.5.0 (update of 2018 Apr. 23). A Generalized Linear Mixed Model was used to further analyse the effect of the location (indoor versus outdoor) on the performance of the treatments. Any variation in the average number of bites received between treatment has also been assessed.

No side effects were observed or reported by any of the volunteers throughout the entire test period. A toxicological evaluation of the ointment according to the invention has been carried out and the evaluation indicated that ointment No. 9 could be used without age limit.

Mosquitoes Diversity

A total of 3.979 mosquitoes, stratified by treatment and species (Table 1) were caught during the tests. Mosquitoes of the genus *Anopheles* formed 98.5% of the total catch, with mosquitoes of the culicine (*Aedes*) making up the remaining 1.5%. Among *Anopheles* mosquitoes, 95% belonged to *An. gambiae* complex, followed by *An. funestus*, and *An. pharoensis*. The frequency of mosquitoes landing on the treated collectors, compared with the control subjects, varied according to the repellent used as shown by Table 1 below:

TABLE 1

| | Treatment | | |
|---|---|---|---|
| Mosquito's species | 20% DEET | Ethanol | Ointment No. 9 |
| *Anopheles gambiae sensu lato* (s.l.) | 686 | 2660 | 480 |
| *Anopheles funestus* | 1 | 2 | 1 |
| Other *Anopheles* | 1 | 9 | 3 |
| *Culicine* | 7 | 106 | 23 |

The hourly mosquitoes biting rate varied significantly between treatments (df=2, $\chi^2$=426.22, p<0.0001). An average of 0.68 (95% CI: 0.51-0.91) mosquito bites was received per person per hour compare to 1.01 (95%: 0.76-1.33) for 20% DEET and 8.98 (95% CI: 6.56-12.29) for ethanol. In addition, there was no variation between treatment according to the location (df=2, $\chi^2$=1.703, p=0.42). Overall, the ratio outdoor:indoor biting 1.26 (95% CI: 1.25-1.27) indicates that more biting was taking place outdoor compare to indoor (df=1, $\chi^2$=5.79, p=0.016).

Repellency Against Mosquitoes

Because *Anopheles gambiae* s.l. was the most abundant species (96.15%) the repellency calculation was focus on this species. The repellency against *Anopheles gambiae* s.l. was stratified by time of collection. From 18 h to 00 h (6 hours after the application), the percentage of repellency varied from 100% to 90% for ointment No. 9 and 20% DEET (the standard repellent reference). Between 00 h to 03 h (9 hours after application), the percentage was between 90% and 80%. After 3 h (10 hours after application), this percentage was under 80% for 20% DEET but ointment No. 9 was still over 80%. Ointment No. 9 gave a high percentage of repellency but no difference in repellency was observed between 20% DEET and ointment No. 9 during the first 9 h after their applications.

When the data were stratified by location of the mosquito's biting, the trend was the same indoor and outdoor. No difference during the 9 first hours between ointment No. 9 and 20% DEET has been shown, as shown on FIG. 1 and table 2 below:

TABLE 2

| | A - Anopheles gambias sl (indoor) | | | B - Anopheles gambias sl (outdoor) | | |
|---|---|---|---|---|---|---|
| | 20% DEEt | Ethanol | Ointment No. 9 | 20% DEET | Ethanol | Ointment No. 9 |
| Median CPT | 480 | 60 | 480 | 480 | 120 | 450 |
| Lower CI | 440 | <60 | 440 | 447 | 95 | 428 |
| Upper CI | 521 | NA | 521 | 513 | 145 | 472 |

Therefore, these results demonstrate that ointment of the invention, such as ointment No. 9, are effective to protect both indoor and outdoor.

Complete Protection Time

The complete protection time is estimated from the time elapsed up to the first mosquito landing and/or probing in each replicate. The median CPT and its confidence interval were estimated using the Kaplan-Meier survivor function procedure. The median CPT of 20% DEET and ointment No. 9 were estimated at 480 minutes again 120 minutes for the negative control.

When the CPT is considered for outdoor collections, the median CPT vias respectively 480 minutes for 20% DEET and ointment No. 9, and 120 minutes for Control. For indoor collections, these estimates were 480, 450 and 60 minutes respectively for 20% DEET, ointment No. 9 and Ethanol.

Statistical analyses showed there was no difference in the median CPT between 20% DEET and ointment No. 9 (df=1, $\chi^2$=0.2, p=0.7). However, there was a significant difference between median CPT from ointment No. 9 and the Control (df=2, $\chi^2$=106, p<0.0001, FIG. 2). Even when the collection was stratified by location, this difference still occurred in both indoor (FIG. 3; df=2, $\chi^2$=41.6, p<0.0001) and outdoor collections (FIG. 4; df=2, $\chi$2=66.7, p<0.0001). The protection time increased by four-fold when comparing both ointment No. 9 and 20% DEET to Ethanol (Table 3),

TABLE 3

| *Anopheles gambiae* s.l. | | | |
|---|---|---|---|
| | 20% DEET | Ethanol | Ointment No. 9 |
| Median CPT | 480 | 120 | 480 |
| Lower Cl | 454 | 91 | 448 |
| Upper Cl | 506 | 149 | 512 |

Example 3—Protection and Repellency Assay No. 2

The study was conducted under ambient condition in the semi-field system (SFS) located in Bagamoyo district at the Ifakara Health Institute at Bagamoyo branch in Tanzania. Bagamoyo is located on the coast region of the Indian Ocean between latitudes 6° and 8' South and between longitudes 30° and 37' East. The district experience annual rainfall ranging between 800 mm and 1000 mm, temperature ranging between 22° C. and 33° C., and mean relative humidity of 73%.

Three laboratory-reared mosquito strains, aged 6 days old, sugar starved for 8 hours, nulliparous females, reactive to human odor on the day of the experiment, have been used for this experiment. Mosquito strains used were: (i) the pyrethroid insecticide resistant (20% mortality) *An. arabiensis* (Kingani, (ii) fully pyrethroid susceptible *An. gambiae* s.s. (Kisumu) and (iii) *Ae. aegypti* (Bagamoyo). The vector control product-testing unit of IHI supplied all mosquitoes used in the experiments.

The mosquitoes were reared in the insectary following MR4 guideline (MR4. Methods in *Anopheles* Research 2016; 2015 Edition). Adults were kept inside cages measuring 30 cm×30 cm×30 cm. Only hyperactive mosquitoes were selected at least 8 hours before the experiment. *An. arabiensis* were coloured using a fluorescent dye that did not affect their fitness nor host preference. About 30 minutes before the experiment, mosquitoes were transferred to the SFS to acclimatize the environmental conditions. The SFS offered the following advantages; 1) volunteers were exposed to laboratory-reared mosquitoes only, 2) experiments were run using a known number of mosquitoes throughout the experiments; 3) mosquitoes used were of known age (6 days), physiological status and avidity. These features improve data quality and less results variability between days and volunteers.

Three treatments have been tested: (i) Ethanol 100% as a negative control, (ii) 20% DEET diluted in ethanol 100% as a positive control, and (iii) ointment No. 9.

Volunteers wore shorts, closed shoes and bug jacket to ensure mosquitoes had access to the lower limbs only. Volunteers applied 20% DEET and ointment No. 9 at an average rate of 2 mg/cm$^2$ of the repellent to the lower limbs using latex glove to minimize absorption onto volunteer's hand. After application, an empty plastic cups were weighed to determine the quantity of repellent left in the cup. The composition of the ointment was not disclosed to the volunteers.

The study was divided into two experiments: one for *Anopheles* mosquitoes conducted in the late evening and the other for *Ae. aegypti* mosquitoes conducted early in the morning. The experiment for *Anopheles* started at 17:55 and that for *Ae. aegypti* at 06:00 hours.

The experiments were conducted for a total of 18 days. During the first 9 days 100 mosquitoes (50 per species) were released in each compartment starting at 18:00 hours for *Anopheles* species and at 06:00 hours for *Ae. aegypti*. After the release, the number of mosquitoes recaptured by volunteers who applied 20% DEET and ointment No. 9 was insignificant up to 6 hours of recapture period. This warranted to extend the recapture period to 12 hours 9 last days.

During the last 9 days, we used same volunteers, compartments and rotation schedule. Mosquitoes released were 100 per species and volunteers recaptured mosquitoes landing on their lower limbs using a mouth aspirator up to 12 hours of recapture period. Volunteers recorded a time the first mosquito of each species landed on the limb and the recaptured mosquito was placed in a paper cup labelled with volunteers unique identification code, time of collection, position and treatment code. The volunteer kept collecting subsequent mosquitoes up to 12 hours with cups changed after every hour.

At the end of recapture time, mosquitoes were killed by putting in the refrigerator for about 30 minutes and then sorted to species level. If the mosquito recaptured in the control was below 50 percent, the experiment was considered invalid, data discarded and the experiment repeated. In addition, information about environmental condition such as temperature, relative humidity and wind speed on the day of experiment were recorded in the data sheet.

Data analyses were performed in Stata 15.1 (State Corp, USA). Descriptive analyses were carried out using mosquitoes recaptured as a primary outcome and the overall recapture rates per treatment was established.

The protective efficacy of each treatment was established for the data collected up to 12 hours and the percentage protective efficacy was calculated using formula (2).

The average complete protection time (CPT) for each treatment was established and reported in minutes. A Kaplan-Meier survival analysis curve was established for each mosquito species against 20% DEET and Ointment No. 9.

The statistical analyses were performed using a mixed effects binomial logistic regression to compare the protective efficacy between 20% DEET and Ointment No. 9. Mosquitoes recaptured after the release in the compartments were modelled as a function of species, treatment, hour of collection and/or position of the volunteers. The 20% DEET was used as a reference in the model. Several models were tested and the best model was determined using the Aikaike's Information Criterion (AIC). The final model selected was the model with the smallest AIV value.

During the 6-hour recapture time, both Ointment No. 9 and 20% DEET provided 100% protective efficacy for all species tested (results not shown). During the 12-hour recapture time, both Ointment No. 9 and 20% DEET provided above 93% protective efficacy for all species tested (table 4). The protective efficacy of Ointment No. 9 against *An. gambiae* s.s, (Kisumu), was 95.9% (95% CI: 95.4-96.3) and 20% DEET was 96.8% (95% CI: 96.3-97.3). The protective efficacy of Ointment No. 9 against *An. arabiensis* (Kingani) was 97.4% (97.1-97.6) and 20% DEET was 97.2% (96.9-97.4). The protective efficacy of Ointment No. 9 against *Ae. aegypti* was 94.6% (93.8-95.4) and 20% DEET was 93.1% (92.2-94.1). In a statistical model comparing Ointment No. 9 to 20% DEET, the results indicated that Ointment No. 9 and 20% DEET have comparable protective efficacy (Table 4 below) with no statically significant difference between them against *An. gambiae* OR=1.53 [0.89-2.66] p=0.128, *An. arabiensis* OR=1.08 [0.57-2.04] p=0.809 and *Ae. aegypti* OR=0.72 [0.32-1.59] p=0.418.

Both Ointment No. 9 and 20% DEET have comparable complete protection time (CPT) as table 4 below. The average CPT of Ointment No. 9 was 571.6 (95% CI: 558.3-584.8) while CPT of 20% DEET was 575.0 (95% CI: 562.1-587.9) against *An. gambiae* (Kisumu), as shown by FIG. 5. For *An. arabiensis* (Kingani), CPT of Ointment No. 9 was 585.6 (95% CI: 571.4-599.8 while CPT of 20% DEET was 580.9 (95% CI: 571.1-590.7), as shown by FIG. 6. For an *Ae. aegypti*, CPT was 444.1 (95% CI: 401.8486.5) while CPT of 20% DEET was 436.9 (95% CI: 405.2-468.5), as shown by FIG. 7.

invention provides protection for at least 7 hours, more specifically between 8-10 hours, against mosquitoes responsible for life-threatening diseases. Also, the ointment of the invention provides a longer protection than the existing repellent, especially the old formulation MAÏA®, and allows a protection for a complete night, unlike the conventional mosquito repellents on the market which provide protection for only 5-6 hours.

Therefore, mosquito repellent ointments according to the invention can be successfully used for the prevention of malaria as well as other diseases such as dengue, chikungunya, Zika and yellow fever.

The invention claimed is:

1. A mosquito-repellent ointment for application to human skin, comprising petrolatum, shea butter, oil, beeswax, 0.5 to 2% by weight of perfume and from 10 to 20% by weight of DEET based on the total weight of the ointment, wherein the mosquito-repellent ointment is monophasic and provides a protection against mosquitoes for at least 7 hours.

2. The mosquito-repellent ointment according to claim 1 providing protection against mosquitoes for about 8 to 10 hours.

3. The mosquito-repellent according to claim 1 comprising between 25 to 65% by weight of petrolatum based on the total weight of the ointment.

4. The mosquito-repellent according to claim 1 comprising between 10 to 45% by weight of shea butter based on the total weight of the ointment.

5. The mosquito-repellent according to claim 1 comprising between 1 to 5% by weight of beeswax based on the total weight of the ointment.

TABLE 4

| Test systems | Test items | Percentage recapture | Percentage protection and 95% CI | Odds Ratio | Z value | P value | 95% CI | Average CRT and 95% CI |
|---|---|---|---|---|---|---|---|---|
| *An. gambiae* s.s (Kisumu) | 20% DEET | 2.5% (31/1258) | 96.8% (96.3-97.3) | 1 | — | — | — | 575 (562.1-587.9) |
| | MAÏA ® Ointment | 3.9% (49/1258) | 95.9% (95.4-96.3) | 1.53 | 1.52 | 0.128 | 0.89-2.66 | 571.6 (558.3-584.8) |
| | Absolute Ethanol | 93.6% (1178/1258) | — | 62.63 | 20.68 | 0.000 | 42.31-92.70 | — |
| *An. arabiensis* (Kingani) | 20% DEET | 2.7% (36/1357) | 97.2% (96.9-97.4) | 1 | — | — | — | 580.9 (571.1-590.7) |
| | MAÏA ® Ointment | 3% (40/1357) | 97.4% (97.1-97.6) | 1.08 | 0.24 | 0.809 | 0.57-2.04 | 585.6 (571.4-599.8) |
| | Absolute Ethanol | 94.4% (1281/1357) | — | 58.93 | 18.68 | 0.000 | 38.43-90.38 | — |
| *Aedes aegypti* | 20% DEET | 4.8% (38/800) | 93.1% (92.2-94.1) | 1 | — | — | — | 436.9 (405.2-468.5) |
| | MAÏA ® Ointment | 6% (48/800) | 94.6% (93.8-95.4) | 0.72 | −0.81 | 0.418 | 0.32-1.59 | 444.1 (401.8-486.5) |
| | Absolute Ethanol | 89.3% (714/800) | — | 11.56 | 8.57 | 0.000 | 6.61-20.23 | — |

As shown by Example 3, Ointment No. 9 is as effective as the positive control to repel mosquito belonging to the *Aedes* and *Anopheles* genus. More specifically, Ointment No. 9 provides at least 7 hours of protection against *Aedes* mosquitoes and at least 9 hours of protection against *Anopheles* mosquitoes.

In summary, the assays show that mosquito repellent ointments according to the invention are effective to repel mosquitoes, especially mosquitoes from the genus *Anopheles* and *Aedes* that are the vectors of the *plasmodium* responsible for malaria as well as other diseases such as dengue, chikungunya, Zika and yellow fever. More specifically, the assays show that ointments according to the

6. The mosquito-repellent according to claim 1 comprising 0.5% by weight of perfume based on the total weight of the composition.

7. The mosquito-repellent according to claim 1 comprising between 1 to 10% by weight of oil based on the total weight of the ointment.

8. The mosquito-repellent according to claim 1 wherein the oil is chosen amongst vegetal oils, mineral oils or their combination.

9. The mosquito-repellent according to claim 8 wherein the oil is cotton seed oil.

10. The mosquito-repellent according to claim 1 comprising 47% by weight of petrolatum, 30% by weight of shea butter, 15% by weight DEET, 4.5% by weight of cotton seed oil, 3% by weight of beeswax, 0.5% by weight of perfume based on the total weight of the ointment.

* * * * *